R. F. RUNGE AND S. CLIFFORD.
CHUCK.
APPLICATION FILED APR. 10, 1917.
1,320,361.
Patented Oct. 28, 1919.
2 SHEETS—SHEET 1.
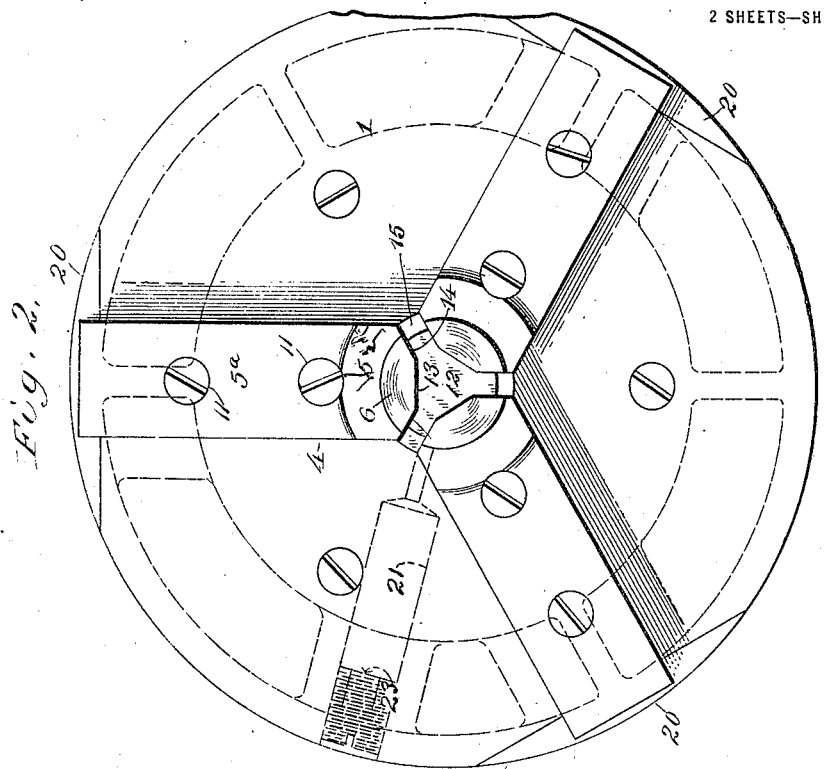
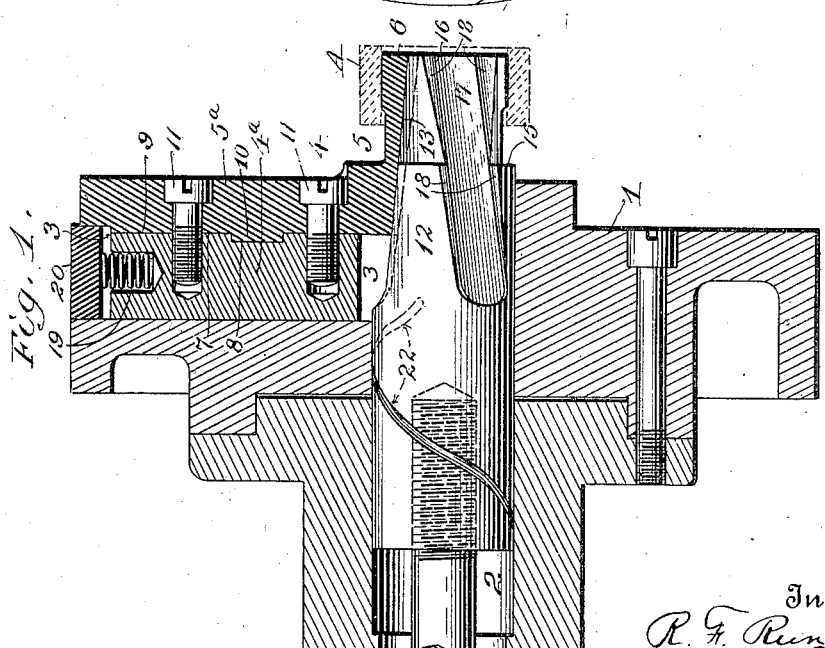

R. F. RUNGE AND S. CLIFFORD.
CHUCK.
APPLICATION FILED APR. 10, 1917.
1,320,361.
Patented Oct. 28, 1919.
2 SHEETS—SHEET 2.
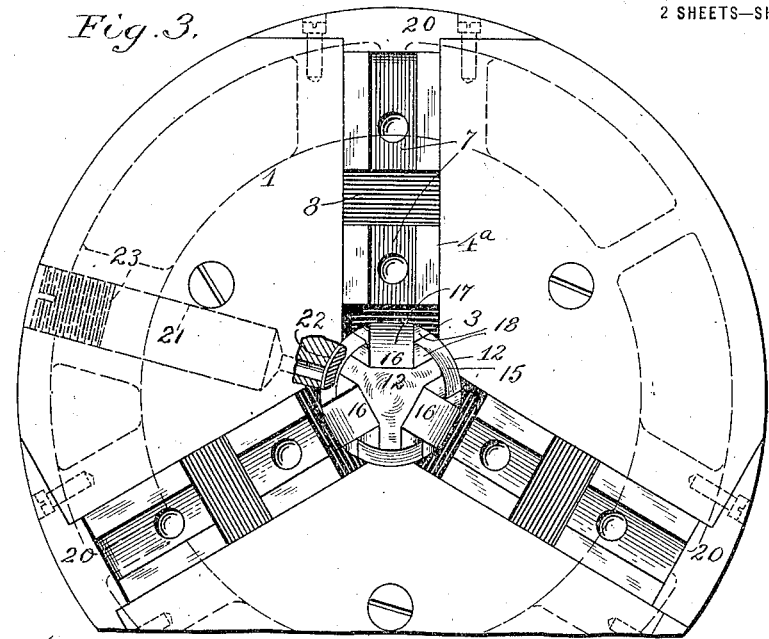
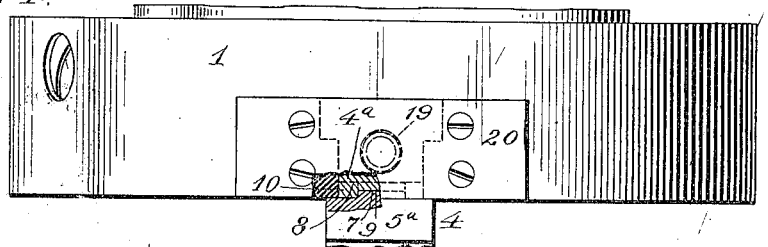
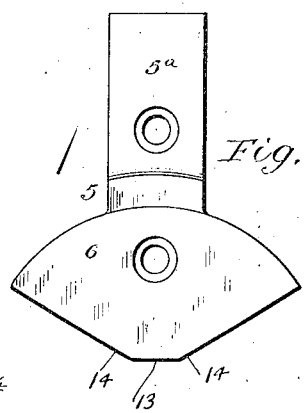
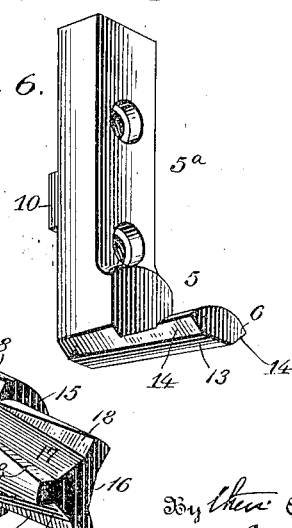
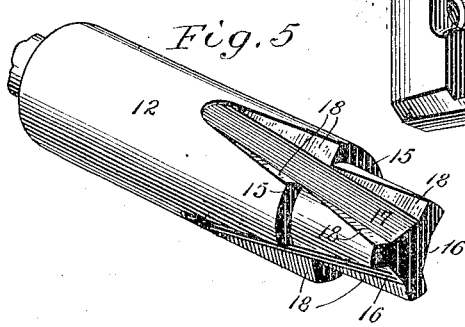

UNITED STATES PATENT OFFICE.

ROBERT F. RUNGE AND SPENCER CLIFFORD, OF PHILADELPHIA, PENNSYLVANIA.

CHUCK.

1,320,361.        Specification of Letters Patent.      Patented Oct. 28, 1919.

Application filed April 10, 1917. Serial No. 160,917.

*To all whom it may concern:*

Be it known that we, ROBERT F. RUNGE and SPENCER CLIFFORD, citizens of the United States, residing at Philadelphia, in the county of Philadelphia and State of Pennsylvania, have invented certain new and useful Improvements in Chucks, of which the following is a specification, reference being had therein to the accompanying drawing.

This invention relates to work-holding chucks designed more particularly for handling annular work forms such as rings, cylinders and the like, and has special reference for application in connection with chucks which engage the interior of the work so that its outer surface may be subjected to forming, shaping, finishing or like operations.

One of the objects of the invention is to adapt the chuck to handle work forms of different sizes, and with this aim in view the invention consists in the combination with a chuck body, of a plurality of work-holding jaws mounted therein and movable to act on the work, said jaws comprising each a body portion mounted and guided in the chuck body, and an active portion or jaw proper which is detachably connected with the body portion, so that jaws of one size for handling work of a given diameter may be removed and jaws of other sizes for handling work of greater or less diameter may be substituted.

The invention consists also in so forming and connecting the detachable portions of the jaws to their body portions, and in such relation to the face of the chuck body, that the entrance of dust, dirt, grindings or other foreign matter to the interior working parts of the chuck will be effectually prevented.

The invention consists also of an improved form of the jaws at their inner ends, which adapts them to be effectively and powerfully operated, and which provides for the maximum extent of contact of the jaws with the work.

The invention consists further of an operating member of improved construction adapted to coöperate with the inner portions of the jaws, and operable to expand or force the same outwardly against the work, the said member and jaws being of such relative construction and formation that there will be the maximum of surface contact between the jaws and the operating member.

The invention consists further in the provision of a lubricant holding chamber in the body of the chuck and communicating with the working parts thereof to maintain the same in lubricated condition.

The invention consists also in various details of construction and combination of parts hereinafter described and claimed.

In the accompanying drawings:

Figure 1 is a longitudinal sectional elevation through a chuck having our invention embodied therein.

Fig. 2 is a front face view of the same.

Fig. 3 is a similar view with the jaws proper removed to expose to view the radially movable body portions of the jaws.

Fig. 4 is a top plan view of the chuck partly broken away.

Fig. 5 is a front perspective view of the operating plunger for expanding or moving the jaws outwardly.

Fig. 6 is a front perspective view of one of the jaws proper detached from the body portion thereof.

Fig. 7 is a front elevation of a jaw proper with the active gripping surface of a larger size to act on annular work forms of greater diameter.

Referring to the drawings:

1 indicates a disk-like body or frame provided with a circular opening 2 extending axially therethrough, the said body being suitably formed so that it may be mounted for rotation about its longitudinal central axis. In its front portion the body is formed with a series of (three in the present instance) radially extending guiding slots 3 which are undercut or dovetailed in cross section and which extend through the front face of the body and communicate at their inner ends with the opening 2.

4 indicates work-holding jaws, one for each guiding slot, and each jaw comprising a radially extending body portion 4$^a$ of a cross sectional form corresponding to that of the guiding slot and mounted for radial movement therein, and a jaw proper 5 consisting of a radial stem 5$^a$ detachably connected with the body portion 4$^a$, and an active gripping portion 6 projecting from the inner end of the stem at right angles thereto axially of the chuck body. The several gripping portions 6 of the jaws project forwardly beyond the front face of the chuck body and have their outer surfaces convex or curved outwardly, whereby they are adapted to bear against the inner curved surface of the annular work piece, in the present instance the ring A, and will, when the jaws are expanded or moved outwardly radially, grip or bind against the interior of the work piece and hold the same firmly in position as shown in Fig. 1.

The front faces of the body portions 4ª of the several jaws extend flush with the front face of the chuck body, and the stems 5ª seat against the said front faces of the body portion and extend at their side edges beyond the side edges of said body portion so as to overlap the adjacent portions of the face of the chuck body and fit closely against the same; whereby the entrance of dust, dirt, grindings or other foreign matter to the interior of the working parts of the chuck will be effectually prevented.

The said front faces of the body portions 4ª are formed with longitudinal grooves 7 and transverse grooves 8 which receive corresponding ribs 9 and 10 on the inner faces of the stems 5ª, and the stems are firmly but detachably connected with the body portions, in the present instance by means of removable fastening bolts 11 extending through the stems and threaded into the body portions, the interlocking grooves and recesses in the parts maintaining them in relatively fixed positions and preventing any displacement of the jaws proper relatively to the body portions.

The jaws are expanded or moved outwardly radially to act on the work, by means of an operating plunger 12 mounted to move axially in the central circular opening in the chuck body and adapted, when thrust forward, to engage with the inner sides of the active portions 6 of the jaws projecting into said opening, and force them outwardly, the plunger and inner portions of the jaws being of such relative form and construction that the plunger will have the maximum of surface contact with the jaws, and the jaws will have the maximum extent of engagement with the work.

The formation of the parts to bring about these results is shown more particularly in Figs. 2, 5, 6 and 7 where it will be seen that the inner sides of the active portions 6 of the jaws are provided with central flat surfaces 13 extending in planes at angles respectively to the axes of the radial stems 5ª, and with flat side surfaces 14 which slope outwardly in opposite directions from the central surfaces and which extend in planes which are substantially parallel with each other with respect to the adjacent surfaces of adjoining jaws, all of which surfaces are beveled or inclined from the front ends of the jaws rearwardly and toward each other so as to form wedging surfaces. The relations of these several surfaces on the jaws are shown more particularly in Fig. 2 where it will be seen that the surfaces 13 of the several jaws form a triangle with its center coincident with the axis of rotation of the chuck, while the adjacent side surfaces at the forward ends of adjoining jaws are parallel to each other.

The plunger 12 is of circular form in cross section for the main portion of its length and of a size to fit snugly but slidingly in the axial opening in the chuck body, the forward end of the plunger being reduced so that an annular shoulder 15 is formed at the junction of the reduced portion with the main portion. The forward portion of the plunger is formed with three recesses 16 which extend longitudinally thereof from its forward extremity some distance beyond the annular shoulder, which recesses are formed with central flat surfaces 17 inclined to correspond to the central surfaces 13 on the jaws, and with side surfaces 18 sloping from the central surfaces and inclined to correspond with the side surfaces 14 on the jaws. These recesses are therefore of a form to receive the inner sides of the active portions of the jaws, and due to the inclination or wedge-shaped character of the coöperating surfaces, when the plunger is thrust forwardly between the jaws, the several surfaces coöperating with a wedging action, will cause the jaws to be moved radially outward or expanded and to bind against and grip the interior of the work.

It will be observed from the construction described that the plunger contacts with the several jaws throughout the whole extent of their inner sides, thus materially decreasing initial pressure and consequent wear due to sliding action under extreme pressure. Further it will be observed that due to the fact that the sloping side surfaces 14 of one jaw are substantially parallel with the adjacent surface on the next jaw, these jaws may be brought close together when released, without interference by these surfaces, and their outer curved gripping surfaces will engage the inner surface of the work piece throughout substantially its entire circumferential extent.

Further, the construction described enables jaws proper of different sizes for different sized work pieces, to be employed without decreasing the extent of engagement of the jaws with the work, the sides of the larger sized jaws being extended in the same planes as the surfaces 14 against which the plunger acts. This will enable the curved outer sides of the jaws, which contact with the work, to be formed of any circumferential extent desired according to the diameter of the work piece, and as the extended sides of the jaws will be parallel with each other and spaced apart the same distance as that between the surfaces 14 on adjacent jaws, the gripping surfaces will contact with the larger sized work piece throughout substantially its entire extent.

In Fig. 7 is illustrated a jaw having a gripping surface whose radius is greater than that of the smaller sized jaws shown in Fig. 2, thereby adapting the chuck to handle work pieces of correspondingly greater diameter. It will be observed in this figure that the side edges of the gripping portion of the jaw are extended in planes which are continuations of the surface 14 against which the plunger acts, so that a plurality of such jaws will present a gripping surface of increased diameter, and contacting with the larger sized work piece substantially throughout its circumferential extent. The construction described therefore enables jaws proper of different sizes for different sized work pieces to be employed without decreasing the extent of engagement of the jaws with the work.

By reason, therefore, of the detachable connection of the jaws proper with the body portions of the jaws as described, jaws with gripping surfaces of greater or less extent may be substituted, for holding work rings or work pieces of different diameters, while at the same time maintaining the maximum extent of contact of the jaws with the work.

The plunger may be operated either by a directly connected air cylinder or by other suitable means, and as these parts *per se* constitute no part of the present invention they have not been illustrated in the drawings.

The jaws may be moved inwardly in order to release the work when the plunger is retracted, by any suitable and appropriate means. In the present instance we employ for this purpose spiral springs 19 which are seated in radial cavities in the outer ends of the body portions of the jaws and which bear at their inner ends against the bottoms of the cavities and at their outer ends against removable cap plates 20 applied to the edge of the chuck body over the guiding slots 3 therein. The tendency of these springs is to urge the jaws inwardly with a yielding pressure, with the result that when the active portions of the jaws are relieved of pressure by the retraction of the operating plunger, they will be forced inwardly and will thereby release the work.

In order that the working parts of the chuck may be effectively lubricated, the chuck body is formed with a lubricant holding chamber 21 which extends radially from the outer edge of the body and communicates at its inner end with the central axial opening therethrough, and with a spiral lubricant distributing groove 22 in the outer surface of the operating plunger. The outer end of the chamber is closed by a screw plug 23 which may be screwed inward from time to time to force the lubricant from the inner end of the chamber and distribute the same to the surface of the plunger and the working parts operated thereby.

In the foregoing description and accompanying drawings we have disclosed our invention in the particular form as regards the detailed construction which we prefer to adopt. It will be manifest, however, that various changes may be made in these details such as would suggest themselves to the skilled mechanic without departing from the limits of the invention; and further it will be understood that the invention is not limited to any particular form or construction of the parts, except in so far as such limitations are specified in the claims.

Having thus described our invention, what we claim is:

1. In a chuck, the combination with a body, of working holding jaws comprising radial body portions guided in the body for radial movement, and jaws proper consisting of radial stems detachably applied to said body portions, and axial portions integral with the stems and forming the gripping jaws, and means acting directly on said axial portions for operating them to grip the work.

2. In a chuck, the combination with a body having guiding slots therein extending through the front face thereof, of work-holding jaws comprising body portions movably mounted in said slots and extending flush with the front face of the chuck body and jaws proper detachably connected with the body portions and overlapping the face of the chuck body.

3. In a chuck, the combination with a body, of work-holding jaws mounted for radial movement thereon and provided with axially extending gripping portions each having on its inner side a plurality of surfaces angularly related to each other and inclined outwardly in a rearward direction, and an operating plunger movable between said axially extending portion of the jaws and provided with a plurality of sets of surfaces, each set comprising a plurality of surfaces angularly related to each other and adapted, when the plunger is moved forwardly, to bear against the surfaces on the respective jaws and force the latter outwardly.

4. In a chuck, the combination with a body, of work-holding jaws mounted for radial movement thereof and provided with axially extending gripping portions each having on its inner side a central surface and two side surfaces sloping outwardly therefrom, said surfaces being inclined outwardly in a rearward direction, and an operating plunger movable axially between said axial portions of the jaws and provided 5. In a chuck, the combination with a body having an axial opening therethrough and provided with radial slots extending outwardly from said opening, of work-holding jaws having radial portions movable in the slots and axial portions exposed in the opening and extending outwardly from the face of the chuck body, the inner sides of the jaws being provided with central wedge surfaces and outwardly sloping side wedge surfaces, with the side surfaces on one jaw extending in a plane substantially parallel with the plane of the adjacent side surfaces of the adjoining jaws, and an operating plunger movable in the axial opening in the chuck body and provided with longitudinal recesses provided each with a bottom surface and two side surfaces adapted, when the plunger is moved forwardly, to coöperate with the surfaces on the jaws and force the latter outwardly.

6. In a chuck, the combination with a side edges and extending between the respective jaws for operating the same to grip the work.

7. In a chuck, the combination with a body having an axial opening therethrough and having a series of radially extending guiding slots extending outwardly thereof, of work-holding jaws movably mounted in the guiding slots, and an operating plunger movable in the axial opening to engage and operate the jaws, said body being provided with a radially extending lubricant holding chamber communicating at its inner end with said axial opening.

In testimony whereof we have affixed our signatures in presence of two witnesses.

ROBERT F. RUNGE.
SPENCER CLIFFORD.

Witnesses:
C. S. BUTLER,
J. R. DOUGHTY.

Copies of this patent may be obtained for five cents each, by addressing the "Commissioner of Patents, Washington, D. C."